(12) United States Patent
Dong et al.

(10) Patent No.: US 9,517,615 B2
(45) Date of Patent: Dec. 13, 2016

(54) SYSTEM AND METHOD FOR AUTOMATED BACKING FILM REMOVAL

(71) Applicant: The Boeing Company, Chicago, IL (US)

(72) Inventors: Shuonan Dong, Newcastle, WA (US); Joseph Taylor, Pacific, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/691,923

(22) Filed: Apr. 21, 2015

(65) Prior Publication Data
US 2016/0311212 A1 Oct. 27, 2016

(51) Int. Cl.
*B32B 38/10* (2006.01)
*B32B 43/00* (2006.01)
(Continued)

(52) U.S. Cl.
CPC .............. *B32B 43/006* (2013.01); *B26D 1/547* (2013.01); *B26D 2001/008* (2013.01); *B32B 38/10* (2013.01); *B32B 2305/18* (2013.01); *B32B 2305/188* (2013.01); *B32B 2305/28* (2013.01); *B32B 2309/70* (2013.01); *B32B 2311/00* (2013.01); *B32B 2313/04* (2013.01); *B32B 2363/00* (2013.01); *B32B 2605/18* (2013.01); *Y10S 901/30* (2013.01); *Y10T 156/1168* (2015.01); *Y10T 156/1174* (2015.01);
(Continued)

(58) Field of Classification Search
CPC .. B32B 38/10; B32B 43/006; Y10T 156/1168; Y10T 156/1174; Y10T 156/1184; Y10T 156/195; Y10T 156/1961; Y10T 156/1967; Y10T 156/1978; Y10T 156/1989; B26D 1/547; B26D 2001/008

USPC ............... 156/714, 715, 717, 759, 761, 762, 764,156/766; 83/307.1, 444, 448, 580, 651.1, 907
See application file for complete search history.

(56) References Cited

U.S. PATENT DOCUMENTS 4,606,254 A * 8/1986 Schmalz .............. B23D 53/005
83/435.27
5,678,303 A * 10/1997 Wichmann ............. G03B 42/04
29/806

(Continued)

OTHER PUBLICATIONS

"Automated Removal of Prepreg Backing Paper—A Sticky Problem", Bjornsson et al, Proceedings of the SAE 2013, Aerotech Congress and Exhibition, Sep. 24-26, 2013, Montreal, Canada.

*Primary Examiner* — Philip Tucker
*Assistant Examiner* — Nickolas Harm
(74) *Attorney, Agent, or Firm* — Perman & Green, LLP

(57) ABSTRACT

A backing film removal system including a substrate support member configured to support a substrate, where a backing film is attached to the substrate, a backing film separating member arranged operatively with respect to the substrate support member such that at least a portion of the backing film separating member is positionable between at least one portion of the substrate and backing film when the substrate is disposed on the substrate support member, a backing film holding member configured to maintain a separation between the substrate and backing film at the at least one portion of the substrate and backing film, and at least one drive unit connected to one or more of the substrate support member and the backing film separating member and operable to cause relative movement between the substrate support member and the backing film separating member.

8 Claims, 11 Drawing Sheets

(51) Int. Cl.
*B26D 1/00* (2006.01)
*B26D 1/547* (2006.01)

(52) U.S. Cl.
CPC ...... *Y10T 156/1184* (2015.01); *Y10T 156/195* (2015.01); *Y10T 156/1961* (2015.01); *Y10T 156/1967* (2015.01); *Y10T 156/1978* (2015.01); *Y10T 156/1989* (2015.01)

(56) References Cited

U.S. PATENT DOCUMENTS

| | | | | |
|---|---|---|---|---|
| 5,918,517 A * | 7/1999 | Malapert | ............... | B23K 26/10 83/171 |
| 6,832,538 B1 * | 12/2004 | Hwang | ............... | B26D 1/46 83/651.1 |
| 2003/0089214 A1 * | 5/2003 | Fukuta | ............... | B23D 57/0007 83/651.1 |
| 2003/0121601 A1 * | 7/2003 | Tajima | ............... | G09F 7/18 156/254 |
| 2007/0284038 A1 * | 12/2007 | Yamamoto | ............... | B29C 63/0013 156/297 |
| 2009/0183615 A1 * | 7/2009 | Sampica | ............... | B26D 1/547 83/651.1 |
| 2010/0107834 A1 * | 5/2010 | Lai | ............... | B23D 49/02 83/15 |
| 2010/0199818 A1 * | 8/2010 | Lee | ............... | B26D 1/547 83/16 |
| 2011/0023672 A1 * | 2/2011 | Blanchard | ............... | B32B 43/006 83/15 |
| 2011/0041993 A1 * | 2/2011 | Furuya | ............... | B32B 43/006 156/249 |
| 2011/0180218 A1 * | 7/2011 | Ciliberti | ............... | G02F 1/1303 156/705 |
| 2014/0103022 A1 * | 4/2014 | Teck | ............... | B26D 3/28 219/221 |
| 2014/0196854 A1 * | 7/2014 | Lee | ............... | B32B 43/006 156/752 |
| 2015/0083340 A1 * | 3/2015 | Price | ............... | B32B 43/006 156/701 |

* cited by examiner

SYSTEM AND METHOD FOR AUTOMATED BACKING FILM REMOVAL

BACKGROUND

Pre-impregnated materials, such as composite broad goods, are generally supplied in rolls with a backing film or paper adhered to the pre-impregnated side(s) of the material. Once the roll is spread and cut into smaller pieces or plies having a predetermined shape, the backing film must be removed on an individual ply before use.

Generally, the removal of backing film from a pre-impregnated material is performed by hand (e.g. manually). The manual removal of the backing film is time consuming and prone to damaging and contamination of the pre-impregnated material. As an alternative to manual removal of the backing film, vacuum grippers have been used to remove the backing film however, such use of the vacuum grippers is unreliable in an automated production environment. For example, two vacuum grippers can be employed to grip the backing film and the pre-impregnated material from opposite directions and pull the backing film and the pre-impregnated material apart from one another. However, during testing of this separation technique the adhesive forces between the backing film and the pre-impregnated material occasionally overcomes the gripping forces of the vacuum grippers causing the backing film to remain attached to the pre-impregnated material. Accordingly, to improve and increase the automation of handling and placement of pre-impregnated plies, improved techniques for automated removal of the backing film may be desirable.

SUMMARY

A backing film removal system including a substrate support member configured to support a substrate, where a backing film is attached to the substrate, a backing film separating member arranged operatively with respect to the substrate support member such that at least a portion of the backing film separating member is positionable between at least one portion of the substrate and backing film when the substrate is disposed on the substrate support member, a backing film holding member configured to maintain a separation between the substrate and backing film at the at least one portion of the substrate and backing film, and at least one drive unit connected to one or more of the substrate support member and the backing film separating member and operable to cause relative movement between the substrate support member and the backing film separating member.

A method for removing a backing film from a substrate, the backing film attached to the substrate along at least a portion of the substrate, the method including positioning a backing film separating member between the backing film and the substrate at a first location; and moving the backing film separating member relative to the substrate so that the backing film separating member is passed between the backing film and the substrate from the first location along a length of the substrate to separate the backing film from the substrate.

BRIEF DESCRIPTION OF THE DRAWINGS

Figure 1:
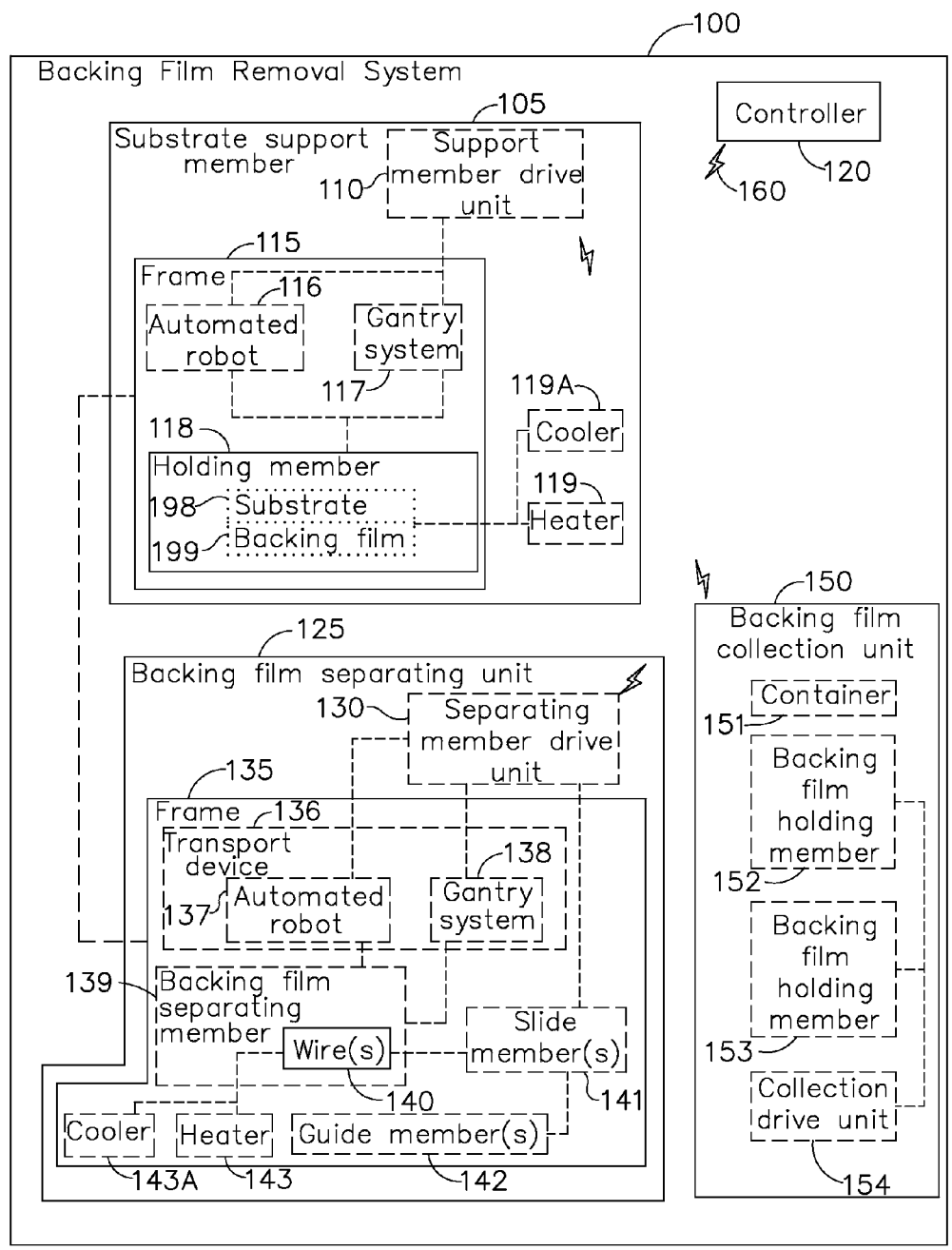
Figure 2:
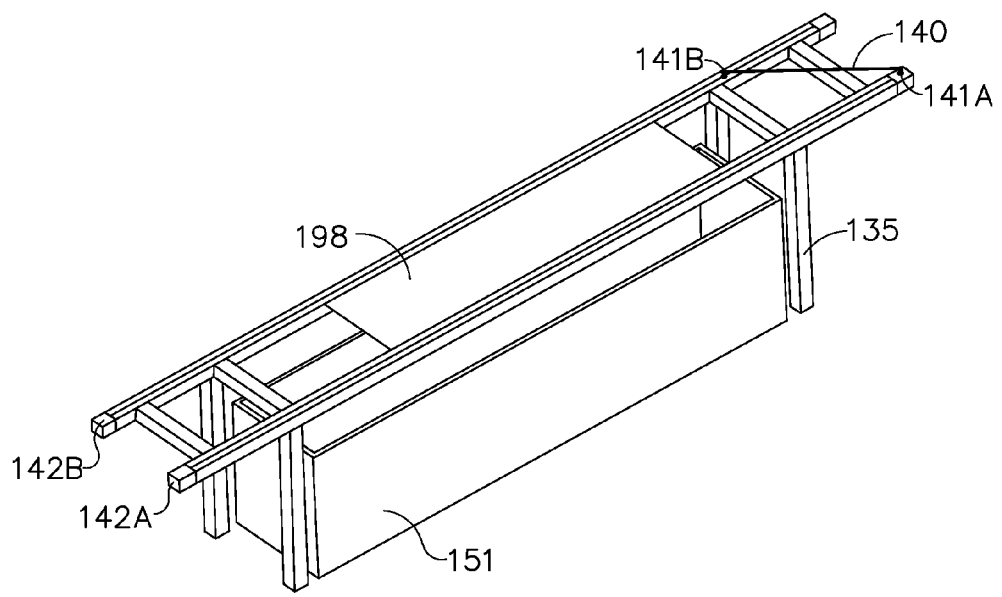
Figure 3:
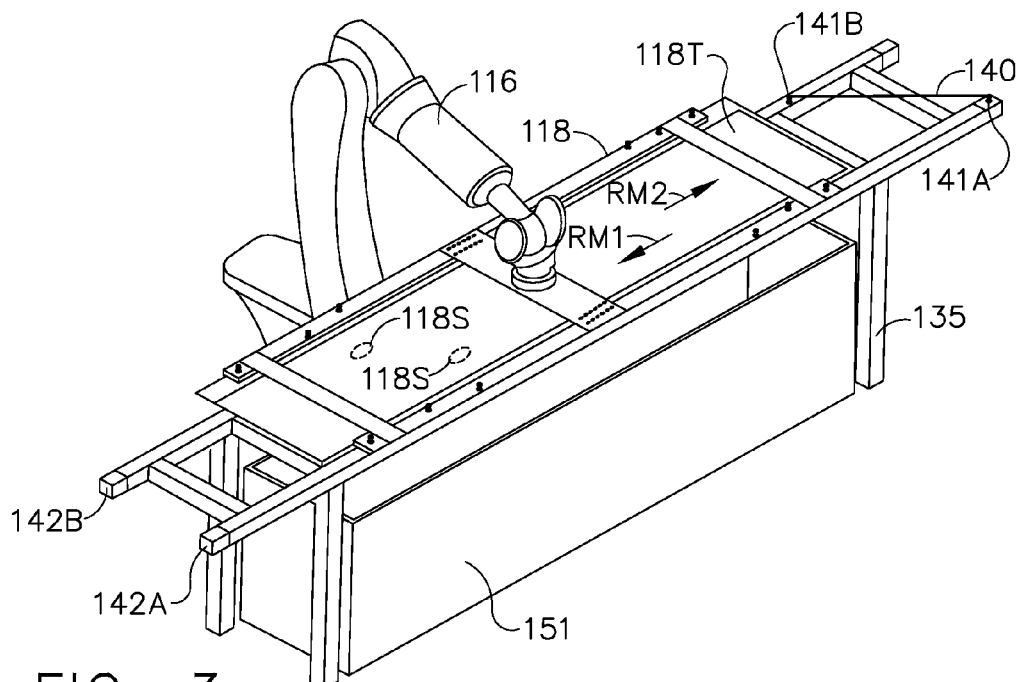
Figure 5A:
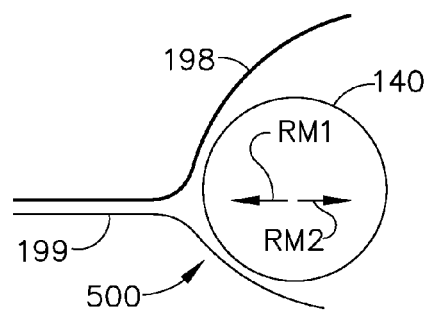
Figure 5B:
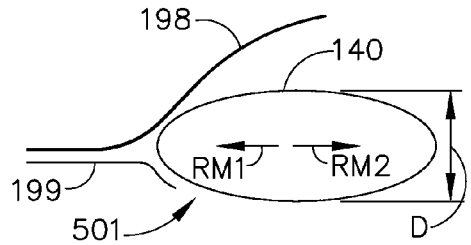
Figure 5C:
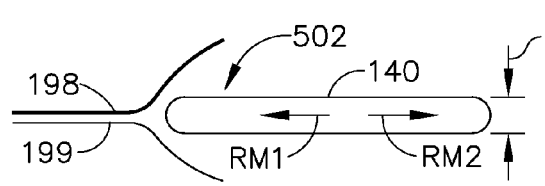
Figure 5D:
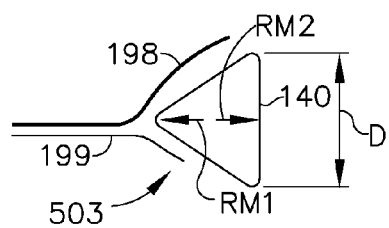
Figure 4:
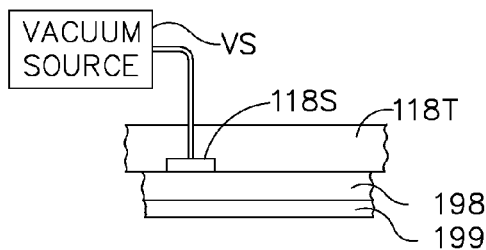
Figure 5E:
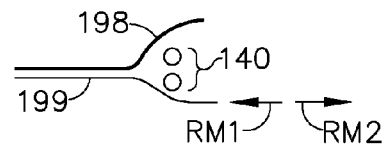
Figure 6:
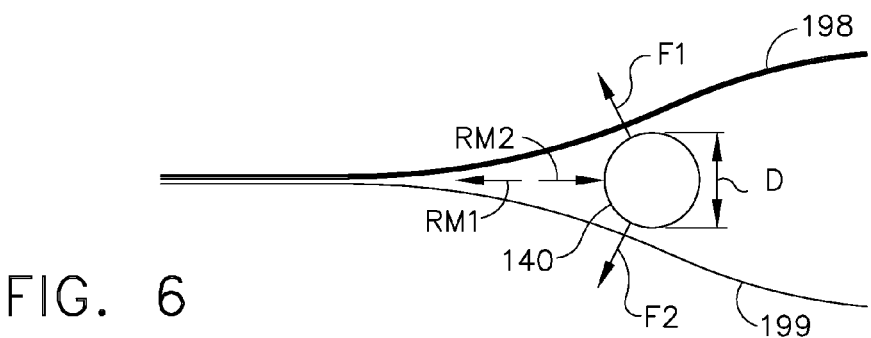
Figure 7:
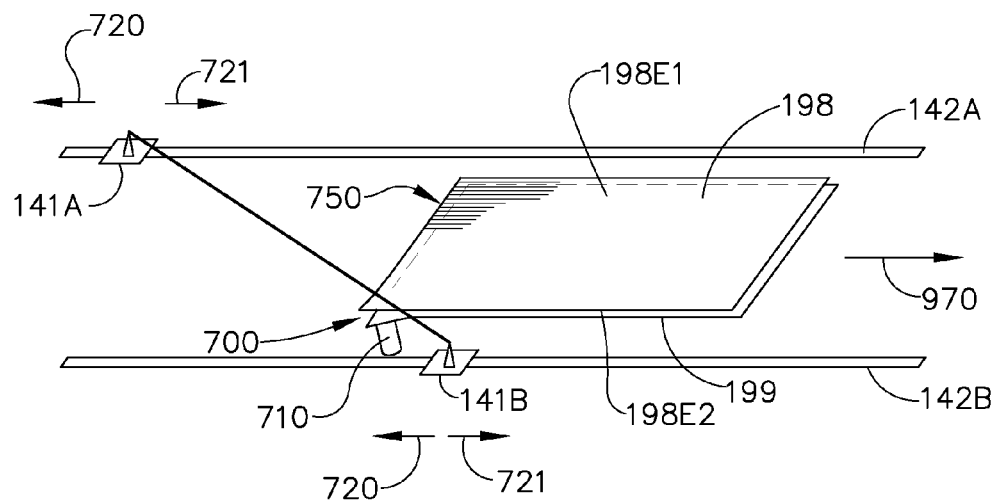
Figure 8:
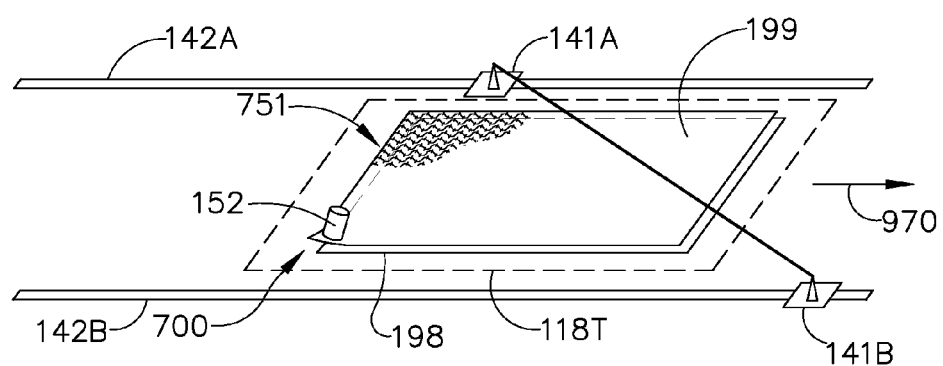
Figure 11:
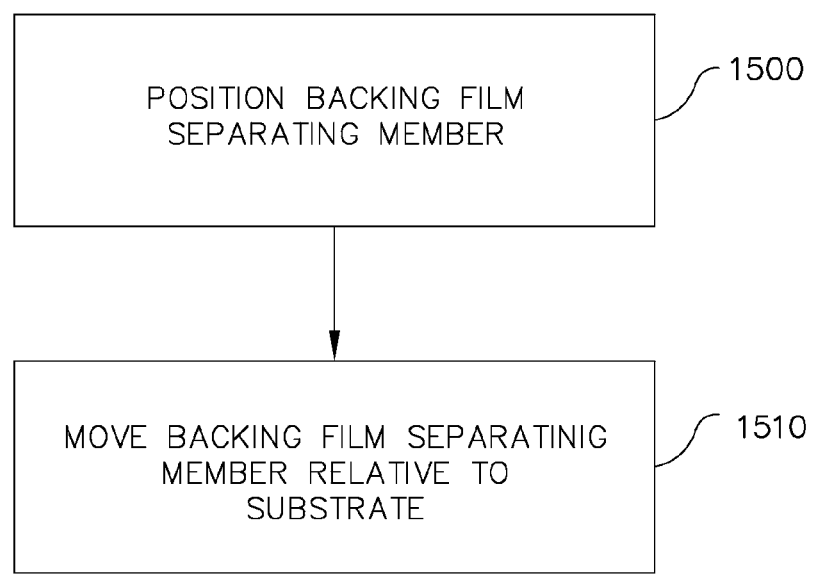
Figure 12:
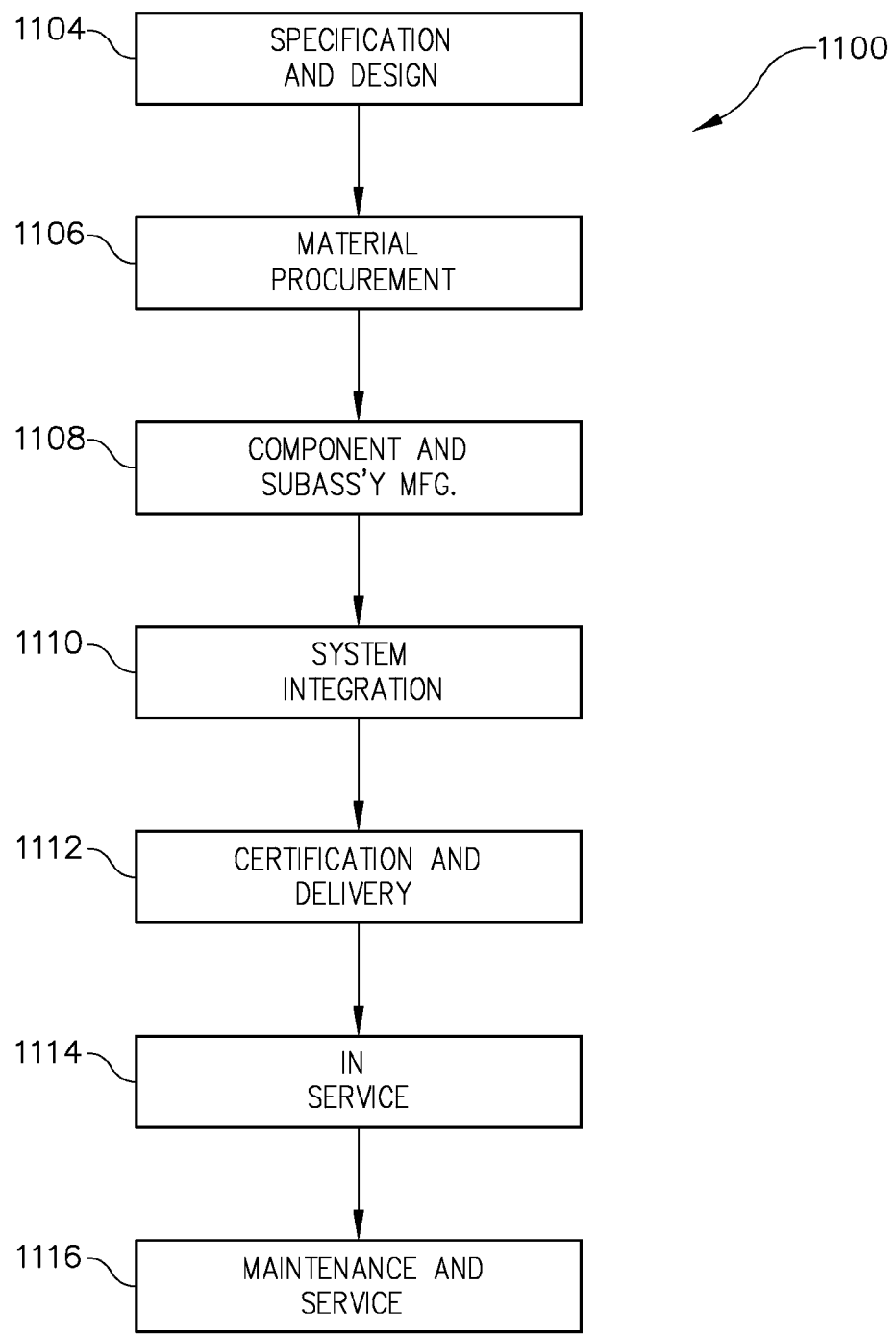
Figure 13:
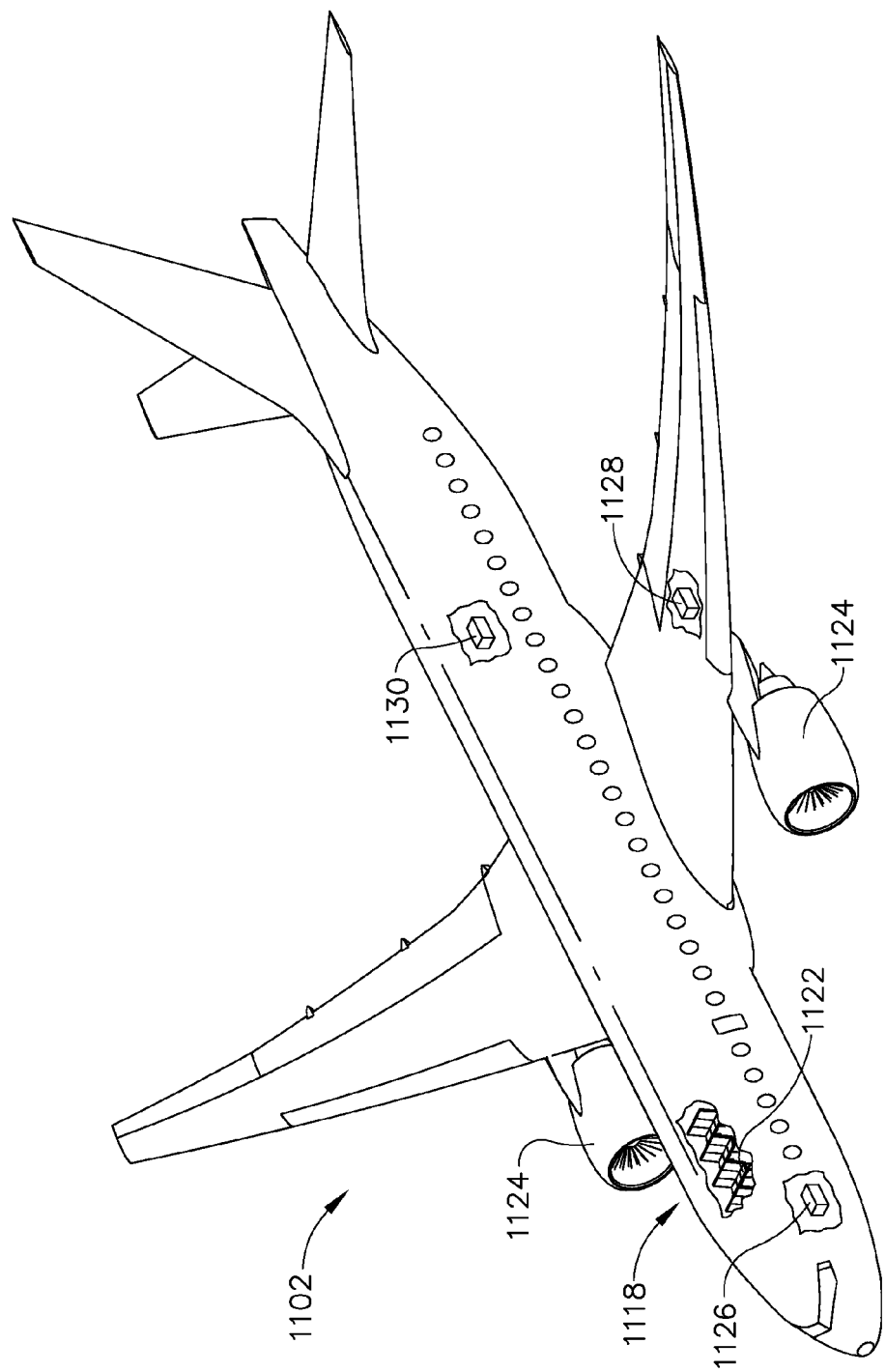

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a backing film removal system, according to one aspect of the present disclosure;

FIG. 2 is a diagrammatic representation of a portion of the backing film removal system, according to one aspect of the present disclosure;

FIG. 3 is a diagrammatic representation of the backing film removal system, according to one aspect of the present disclosure;

FIG. 4 is a diagrammatic representation of a portion of the backing film removal system, according to one aspect of the present disclosure;

FIGS. 5A-5E are diagrammatic representations of a portion of the backing film removal system, according to one aspect of the present disclosure;

FIG. 6 is a diagrammatic representation of a portion of the backing film removal system, according to one aspect of the present disclosure;

FIG. 7 is a diagrammatic representation of a portion of the backing film removal system, according to one aspect of the present disclosure;

FIG. 8 is a diagrammatic representation of a portion of the backing film removal system, according to one aspect of the present disclosure;

FIGS. 9A-9D are diagrammatic representations of a portion of the backing film removal system, according to one aspect of the present disclosure;

FIGS. 10A-10E are diagrammatic representations of a portion of the backing film removal system, according to one aspect of the present disclosure;

FIG. 11 is a flow diagram of backing film removal process, according to one aspect of the present disclosure;

FIG. 12 is a flow diagram of aircraft production and service methodology; and FIG. 13 is a diagrammatic representation of an aircraft including distributed vehicle systems.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIG. 1, a diagrammatic representation of a backing film removal system 100 is shown. The backing film removal system 100 in accordance with the aspects of the disclosed embodiment automates the removal of the backing film 199 from a pre-impregnated substrate 198 to which the backing film is attached. In one aspect, the substrate is a sheet of material, to which a backing film or paper is applied over an adhesive or epoxy. In one aspect, the substrate has a fibrous (e.g. carbon fiber or other fibrous material where the fibers are arranged in a uniform direction) or a woven (e.g. fiberglass or carbon fiber weave) composition. In further aspects, the substrate is a pre-impregnated substrate, e.g., a pre-preg material in which the fibers are pre-impregnated with a matrix, such as an epoxy or resin. In still further aspects, the substrate has a substantially smooth unitary composition (e.g. a sheet of plastic, metal, or other substantially unitary smooth material).

The aspects of the present disclosure provide for the separation of the substrate 198 from the backing film 199 using, for example, shearing and/or tension forces as will be described below. In one aspect, as will be described in greater detail below, the backing film removal system 100 includes a backing film separating member 139 that moves between the substrate 198 and the backing film 199 where the backing film separating member 139 is positioned between the backing film 199 and substrate 198 at a first location, such as along a length of the substrate 198 and arranged operatively with respect to the substrate support member 105 such that at least a portion of the backing film separating member 139 is positionable between at least one portion of the substrate 198 and backing film 199 when the substrate is disposed on the substrate support member 105. In one aspect the backing film separating member 139 is positioned between the backing film 199 and substrate 198 through insertion of the backing film separating member 139 between the backing film 199 and substrate 198 at a pre-separated portion of the substrate 198 (e.g., a pre-separated edge or a pre-separated corner of the substrate) and backing film 199. In one aspect, as will also be described below, a gripping device, such as vacuum grippers, is employed for handling the backing film 199 and/or substrate 198 as the backing film 199 is removed.

In one aspect, the backing film removal system 100 includes a frame 115, 135, a backing film separating unit 125 connected to the frame 115, 135, and a substrate support member 105 connected to the frame 115, 135 and being configured to support a substrate 198 during removal of the backing film 199 from the substrate 198. In one aspect, the frame 115, 135 is common to both the substrate support member 105 and the backing film separating unit 125 while in other aspects, the substrate support member 105 has frame 115 and the backing film separating unit 125 has frame 135 where the frames 115, 135 are connected to each other through a connecting member (such as e.g. rods, beams and/or fasteners) or a floor of a manufacturing facility.

Referring to FIGS. 1, 2 and 3, the substrate support member 105 supports the substrate 198 for removal of the backing film 199. In one aspect, the frame 115 forms an automated robot 116 such as, for example, an automated robot arm while in other aspects the frame 115 forms a crane system such as, for example, a gantry system 117. The substrate support member 105 includes a substrate holding member or end effector 118 connected to the frame 115 (e.g. in one aspect movably coupled to the automated robot 116 while in other aspects movably coupled to the gantry system 117). The substrate holding member 118 is configured for holding a substrate 198 having a predetermined shape and/or size. In one aspect, the substrate holding member 118 includes a table (e.g. gripping member) 118T configured to interface with the substrate. In one aspect the table 118T includes suction grippers 118S (connected to a vacuum source VS) configured to hold the substrate 198 against the table 118T while in other aspects the table 118T includes an adhesion surface (such as a latex fabric) that grips the substrate using, for example, stiction or other releasable grip. In still other aspects, mechanical grippers or electrostatic grippers are used to hold the substrate 198 against the table 118T. Referring also to FIG. 4, the substrate 198 is arranged relative to the table 118T so that when the substrate 198 is gripped or held by the table 118T the substrate 198 is disposed between the table 118T and the backing film 199 (e.g. so that, as described below, the backing film 199 can be removed from the substrate 198 from above or below as the substrate is held on/by the substrate holding member 118). In one aspect, as illustrated in FIG. 3 the table 118T when interfaced with the backing film separating unit 125 may have any predetermined orientation. For example, in one aspect as shown in FIG. 3 the table 118T is oriented so that the substrate 198 (and backing film 199) faces downwards while in other aspects the table 118T is oriented as shown in FIG. 4 so the substrate 198 (and backing film 199) faces upwards. In other aspects, the table 118T and the backing film separating unit 125 have a spatial orientation so that the substrate 198 faces at an angle disposed between the upward and downward orientations for the removal of the backing film 199 from the substrate 198. In one aspect, substrate support member 105 includes a heater 119 and/or cooler 119A connected to the substrate holding member 118 for heating and or cooling the substrate 198 and/or backing film 199 to facilitate loosening or softening the bond between the substrate 198 and backing film 199. In one aspect, the substrate support member 105 includes a support member drive unit 110 connected to the substrate holding member 118 and configured to move or position the substrate holding member 118 (and substrate 198 thereon) relative to the backing film separating unit 125 (e.g. causes relative movement between the backing film separating unit 125 and the substrate support member 105) as will be described below.

Referring to FIGS. 1, 2 and 3 the backing film separating unit 125 includes the backing film separating member 139 which is movably connected to the frame 135. In one aspect the frame 135 includes one or more guide members 142 (such as guide members 142A, 142B). One or more movable members 141 (such as movable members 141A, 141B) are movably mounted to respective guide members 142 so that the movable members 141 travel along and are guided by the respective guide members 142. For example, the guide members 142 may be implemented as rails and the movable members 141 may be implemented as rollers operatively engaged with the rails and configured for rolling contact with the rails. In other examples, slidable members may be used in place of the rollers, the slidable members coupled in sliding engagement with guide members 142.

In one aspect, the backing film separating member 139 includes one or more wires 140 that span between the movable members 141 (such as movable members 141A, 141B) where the movable members 141 are spaced from each other by a predetermined distance so that the wire 140 extends beyond opposing peripheral edges 198E1, 198E2 (see FIG. 7) of the substrate when the substrate 198 is positioned relative to the backing film separating unit 125 for backing film 199 removal. In one aspect the backing film separating member and the movable members are integrally formed as a one piece member while in other aspects the backing film separating member is coupled to the movable members such as through mechanical fastening. In one aspect, the movable members 141 are arranged so that the wire 140 is disposed at a crossing angle relative to a direction of relative movement RM1, RM2 (see also FIGS. 5A-5E) between the backing film separating member 139 and the substrate support member 105 (such as the substrate holding member 118 of the substrate support member 105). In other aspects, the frame 135 forms a transport device 136 to which the backing film separating member 139 is attached. In one aspect, the transport device 136 includes an automated robot 137, substantially similar to automated robot 116, where the backing film separating member includes a wire 140 movably coupled to the automated robot 137 for rotation about a predetermined axis 972 (see FIG. 9A) as will be described below where the transport device 136 drives the backing film separating member 139 both rotationally and linearly relative to the substrate support member 105. In one aspect, the transport device 136 includes a gantry system 138 to which the backing film separating member 139 is attached for moving the backing film separating member 139 (such as wire 140) between the substrate 198 and the backing film 199 as described herein (e.g. in a manner substantially similar to that described with respect to the automated robot 137). In one aspect, the backing film separating unit 125 includes a heater 143 and/or cooler 143A connected to the backing film separating member 139 for heating and/or cooling the backing film separating member 139 (e.g. to facilitate loosening or softening the bond between the substrate 198 and backing film 199). In one aspect, the backing film separating unit 125 includes a separating member drive unit 130 connected to the backing film separating member 139 and configured to move or position the backing film separating member 139 relative to the substrate 198 and backing film 199 (e.g. causes relative movement between the backing film separating unit 125 and the substrate support member 105) for removal of the backing film 199 as described herein. In one aspect the separating member drive unit 130 moves the backing film separating member 139 along a predetermined path 950, 960, 970 (see FIGS. 8, 9D and 10E—as will be described in greater detail below) between the backing film 199 and substrate 198 to effect separation of the backing film 199 from the substrate 198.

Referring to FIGS. 5A-5D, as used herein the term "wire" is inclusive of monofilament wires, stranded or braided wires, stranded or braided wires with a coating (such as e.g. plastics or metals) covering the stranded or braided wires, and rods. The wire 140 may be constructed of a material such as, for example, plastics and/or metals. The wire 140 described herein includes a predetermined cross section such as, for example, a round cross section 500, an oval cross section 501, a triangular cross section 503, and a flat rectangular plate (e.g. spatula) cross section 502 having two sides that are shorter than the remaining two sides. In one aspect, the wire 140 has predetermined dimensions that effect separating the backing film 199 from the substrate 198. For example, the wire 140 includes a separation dimension D (e.g. a height of the wire 140 that effects separation of the backing film 199 from the substrate 198) of less than about 0.100 inches, while in other aspects the separation dimension D is between about 0.010 inches and 0.030 inches, while in still other aspects the separation dimension D is more than about 0.100 inches or less than about 0.010 inches. In one aspect, where the cross section is triangular, oval or a flat rectangular plate, the wire is oriented so that a shorter or pointed side of the cross section faces the direction of relative movement RM1, RM2 of the wire 140 against the backing film 199 and substrate 198, while in other aspects the a longer or flat side of the cross section of the wire may be faces the direction of relative movement RM1, RM2. In still other aspect, the wire 140 may rotate about its axis during separation of the backing film 199 from the substrate 198. In one aspect, the wire 140 includes more than one wire member arranged adjacent one another (see FIG. 5E) where the wire 140 includes two adjacent wire members but in other aspects any number of wire members are disposed adjacent (or next to) one another in any predetermined configuration (such as e.g. twisted or intertwined with each other). Where the wire 140 includes corners or edges that interface with the substrate 198, the corners or edges are rounded to prevent damage to the substrate 198. In one aspect, where the substrate 198 is a fibrous material the wire is arranged at a crossing angle relative to a direction of the fibers 750 of the material, where the crossing angle is an angle that is not parallel with (e.g. crosses) a direction of the fibers 750 (See FIG. 7) of the substrate 198 where at an angle relative to fibers 750 in the substrate 198 includes angled relative to a direction of a majority of fibers 750, while in other aspects the wire 140 is substantially parallel with the fibers 750 of the material. In one aspect, where the substrate 198 is a woven material the wire 140 is arranged at a crossing angle relative to a direction of the weave 751 of the material, where the crossing angle is an angle that is not parallel with (e.g. crosses) a direction of the fibers in the weave 751 (See FIG. 8) of the substrate 198, while in other aspects the wire 140 is substantially parallel with the weave 751 of the material.

Referring to FIGS. 2 and 3, in one aspect, the backing film removal system 100 further includes a backing film collection unit 150 disposed relative to the substrate 198 and backing film 199 so as to receive the backing film 199 when the backing film 199 is separated from the substrate 198. In one aspect the backing film collection unit 150 includes a container 151 configured to receive the separated backing film 199. In one aspect, the container 151 is positioned relative to the substrate support member 105 and the backing film separating unit 125 so that as the backing film 199 is separated from the substrate 198 the backing film 199 falls (e.g. under the affects of gravity) into the container 151. In one aspect the backing film collection unit 150 further includes, as will be described below, one or more of a movable gripping member or backing film holding member 152 (See FIGS. 9A and 9B—where the backing film holding member 152 grips and removes the separated backing film), a collection member or backing film holding member 153

(see FIGS. 9C and 9D—where separated backing film 199 is spooled around the backing film holding member 153) and collection drive unit 154 connected to the one or more of the backing film holding member 152 and backing film holding member 153 for moving the backing film holding member 152 and backing film holding member 153 so as to collect the separated/removed backing film 199.

In one aspect, a controller 120 is connected to one or more of the substrate support member 105, the backing film separating unit 125 and the backing film collection unit 150 for controlling the backing film removal system 100 in the manner described herein. The controller 120 is connected to the one or more of the substrate support member 105, the backing film separating unit 125 and the backing film collection unit 150 by connection 160 which in one aspect is a wired or wireless connection.

Referring to FIGS. 1, 2, 3, 6 and 7 an exemplary operation of the backing film removal system will be described according to an aspect of the present disclosure. In one aspect the substrate support member 105 (which in this aspect includes automated robot 116 but in other aspects includes gantry system 117 or other support for supporting the substrate while separating the backing film 199) holds the substrate 198 side of the pre-impregnated material, as described above, such that the backing film 199 faces downwards towards the container 151. The guide members 142A, 142B are disposed outside the perimeter of the substrate 198. The backing film separating member 139, such as wire 140, are attached to movable members 141A, 141B disposed on their respective guide members 142A, 142B. In one aspect, the movable members 141A, 141B are adjustable relative to one another to maintain tension on the backing film separation member 139. The backing film separating member 139 is inserted or positioned between the backing film 199 and the substrate 198 at a first location of the substrate such as at a pre-separated portion (e.g., pre-separated corner 700) of the substrate/backing film (FIG. 11, Block, 1500). In one aspect, gripper or backing film holding member 710 (which in one aspect is part of the backing film separation unit 125, substrate support member 105 or the backing film collection unit 150), such as a vacuum gripper similar to backing film holding members 152 is employed maintain separation of the backing film 199 at the pre-separated corner 700 while in other aspects, gravity or any mechanical or pneumatic separating mechanism maintains the separation of the backing film 199 at the pre-separated corner 700. The backing film separating member 139 and the substrate are moved relative to one another, such as through operation of one or more of the support member drive unit 110 and the separating member drive unit 130, so that the backing film separating member passes between the backing film 199 and the substrate 198 from the first location along a length of the substrate to break the bond between the backing film 199 and the substrate 198 (FIG. 11, Block 1510).

In one aspect, the backing film separating member 139 moves between the backing film 199 and substrate 198 along a length of the substrate 198 causing local mechanical deformations (e.g. due to, for example, forces F1, F2 exerted on the backing film 199 and substrate 198 by the backing film separating member 139) in the pre-impregnated material to locally overcome the adhesive forces between the backing film 199 and substrate 198. As can be seen in FIG. 6, the backing film separating member 139, such as wire 140, generates compressive forces F1, F2 in two directions, one against the substrate 198 and the other against the backing film 199, forcing separation of the backing film 199 from the substrate 198. Separating the backing film 199 from substrate 198 with the backing film separating member 139 is more reliable than using only, for example, vacuum grippers on the outsides of the backing film 199 and substrate 198 to pull the materials apart because the compressive forces F1, F2 are caused by the physical existence of the backing film separating member 139, whereas the tensile forces formed by the vacuum grippers are dependent on a strength of the vacuum and a quality of the vacuum seal.

In one aspect, the movable members 141A, 141B are driven by the separating member drive unit 130 so as to move in unison or differentially (e.g. under the control of controller 120) depending on a shape and/or orientation of the substrate 198. In one aspect, the movable members 141A, 141B are moved along a predetermined path 970 between the backing film 199 and substrate 198 for separation of the backing film 199 from the substrate 198.

Referring to FIG. 8, an exemplary operation of the backing film removal system is illustrated according to an aspect of the present disclosure. The removal of the backing film 199 in this aspect is substantially similar to that described above however, in this aspect the substrate support member 105 holds the substrate so that the backing film 199 faces upwards. Here backing film holding member 152 (or vacuum gripper 710) is employed to hold the pre-separated corner 700 and remove the backing film 199 as the backing film is separated from the substrate 198 in the manner described above. The backing film holding member 152 deposits the removed backing film 199 in a container, such as container 151, which is located adjacent (e.g. next to) the backing film separating unit 125.

Figure 9A:
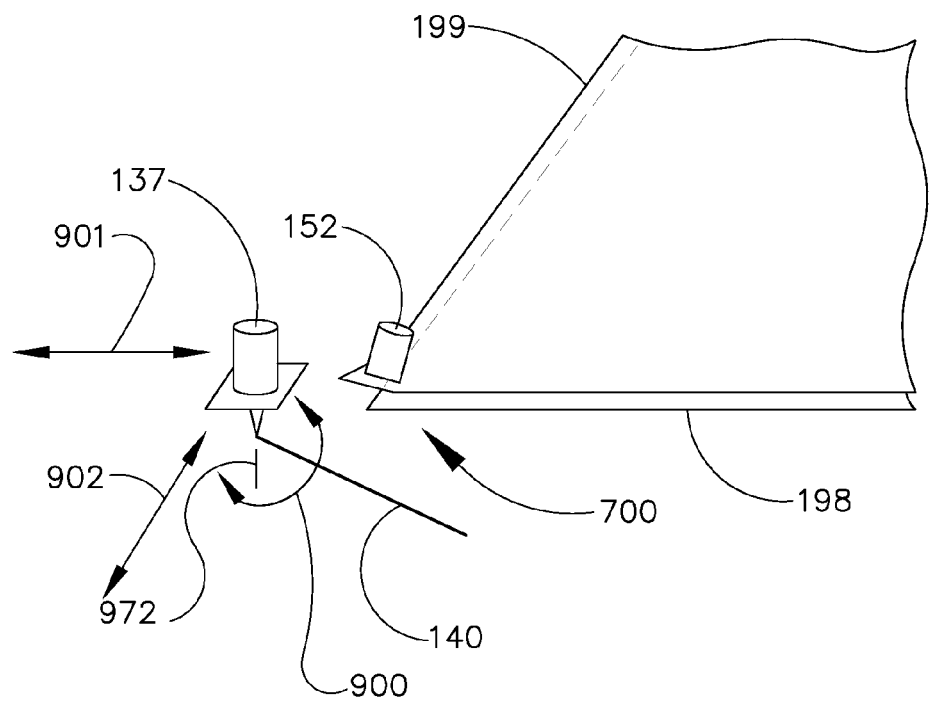
Figure 9B:
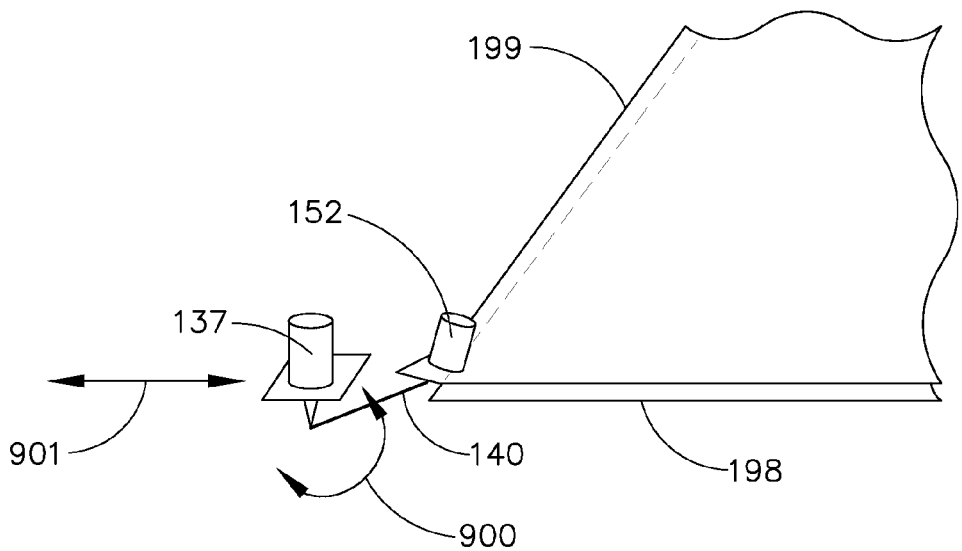
Figure 9C:
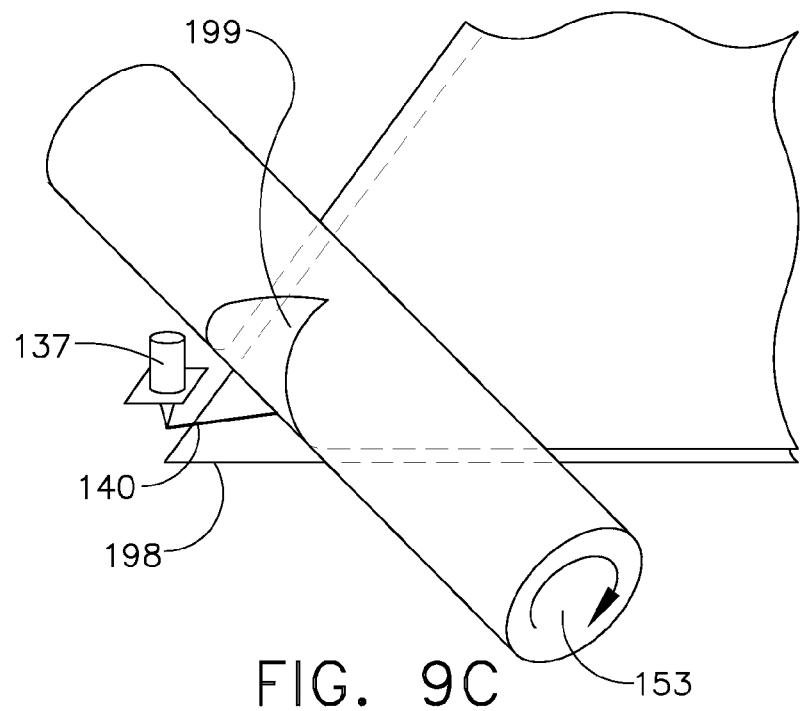
Figure 9D:
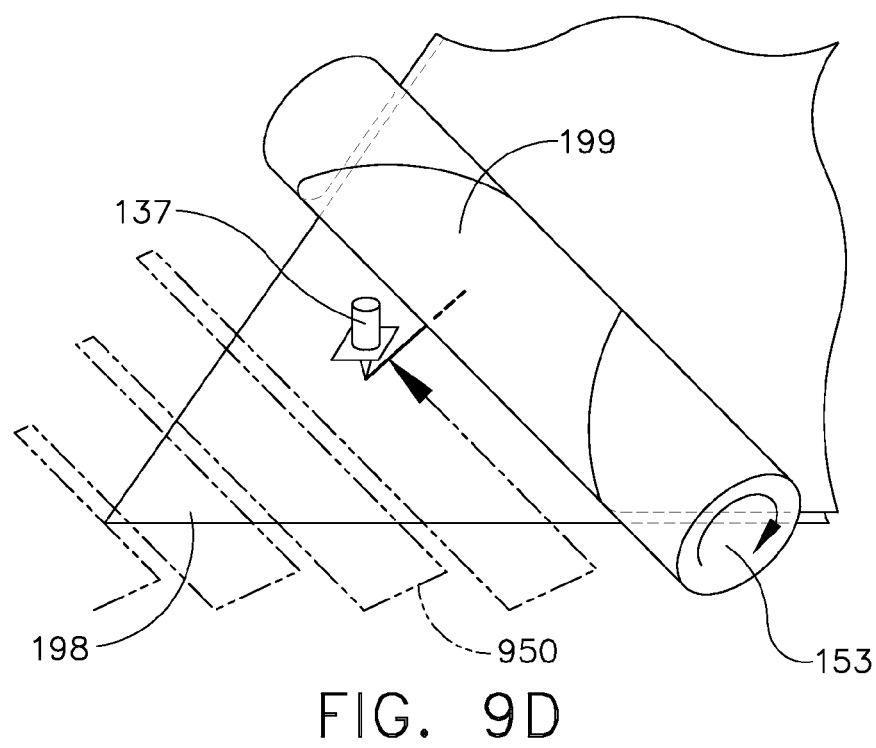
Figure 10A:
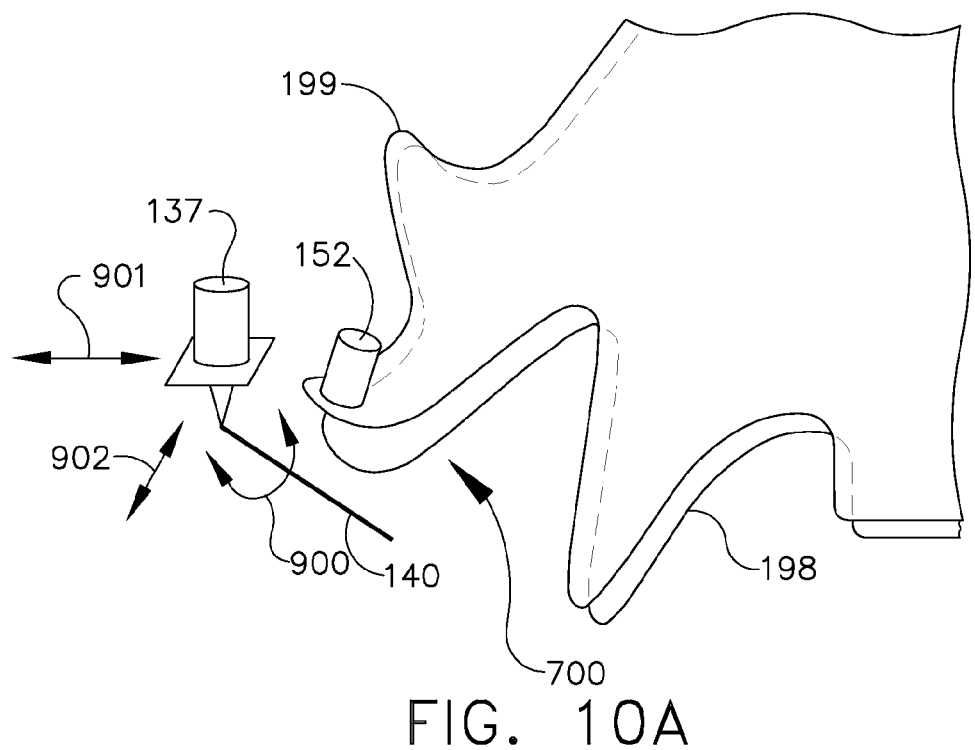
Figure 10B:
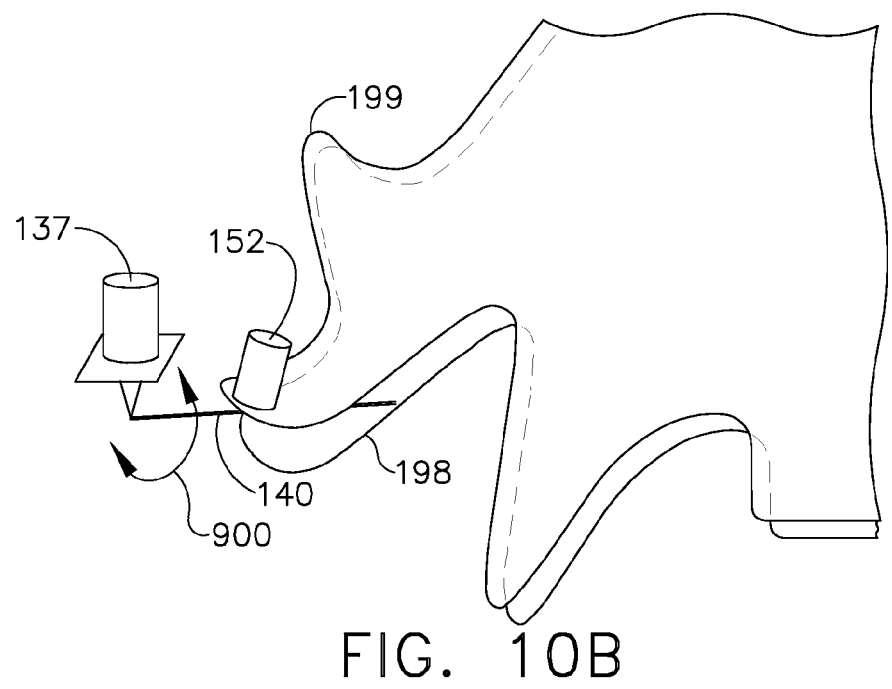
Figure 10C:
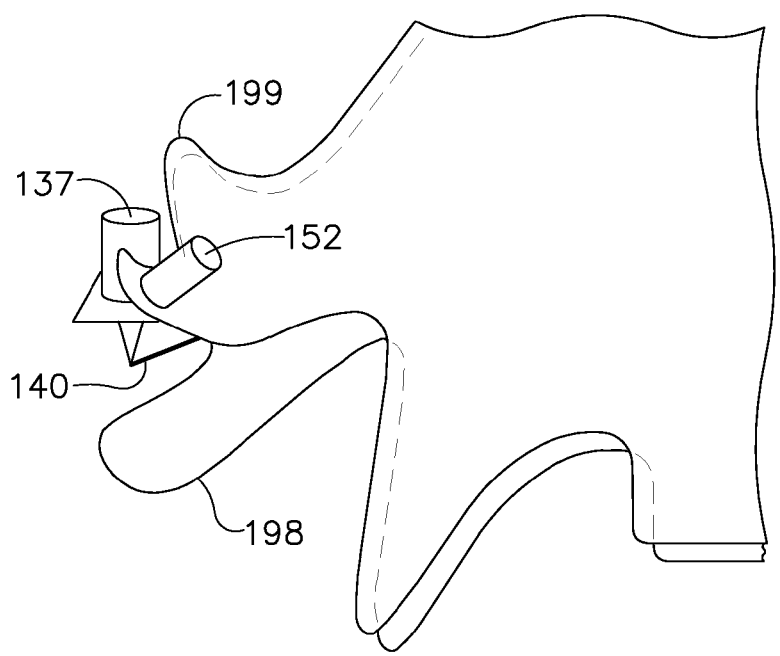
Figure 10D:
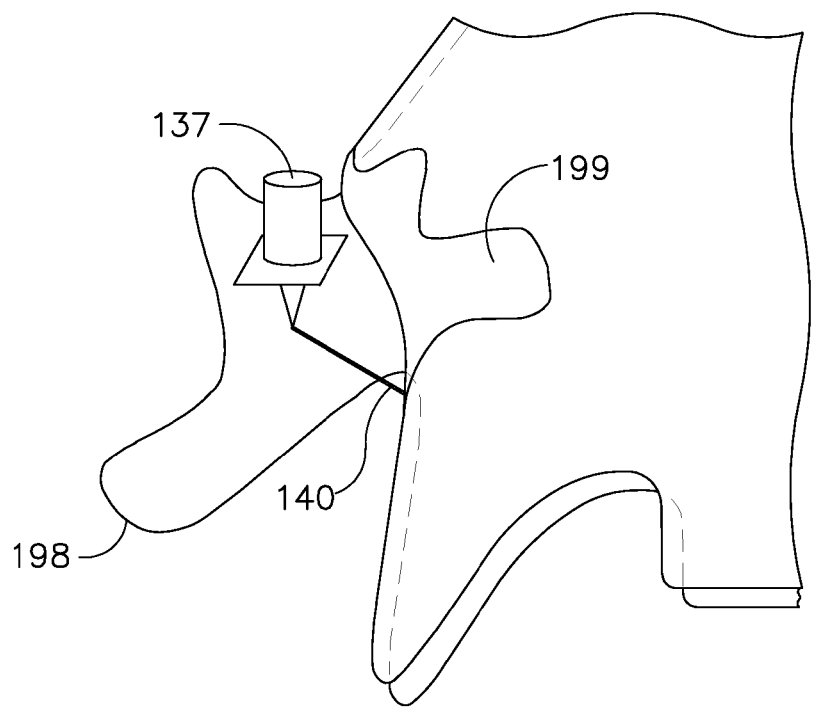
Figure 10E:
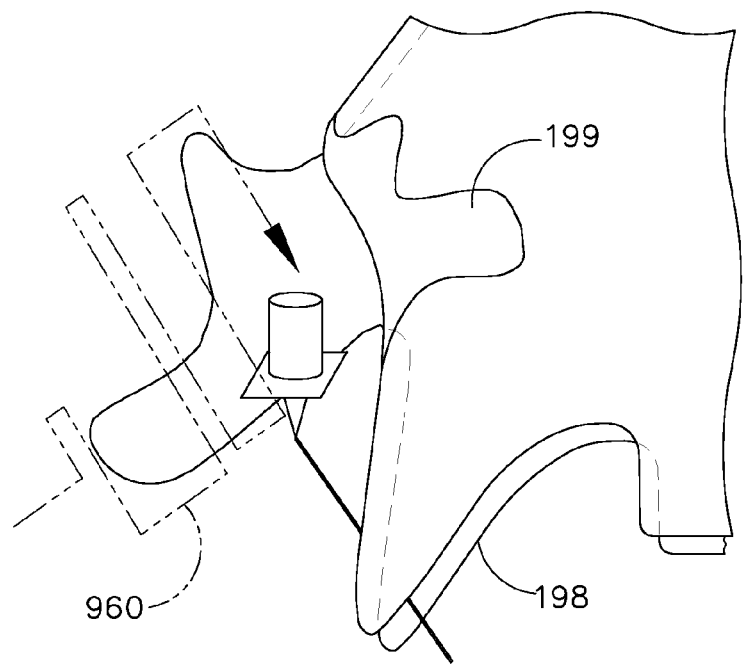

Referring to FIGS. 1, 2, 3, and 9A-9D an exemplary operation of the backing film removal system will be described according to an aspect of the present disclosure. This aspect is employed for irregular or large substrates for which spanning a length and/or width of the substrate with a wire 140 may not be practical or desired. Here, the wire 140 of the backing film separating member 139 is cantilevered from, for example, the transport device 136 to locally separate the backing film 199 from the substrate 198 a little at a time. In one aspect the substrate support member 105 (which in this aspect includes automated robot 116 but in other aspects includes gantry system 117 or other support for supporting the substrate while separating the backing film 199) holds the substrate 198 side of the pre-impregnated material, as described above, such that the backing film 199 faces upwards, while in other aspects the substrate 198 is held so that the backing film faces downwards as described above. Here the backing film separating member 139 is disposed on an automated robot 137 (or in other aspects a gantry system 138) so as to move linearly in two dimensions (e.g. directions 901, 902) in a plane of the substrate 198, as well as rotate about axis 972. The backing film separating member 139 is inserted or positioned between the backing film 199 and the substrate 198 at a first location of the substrate 198 such as at a pre-separated corner 700 of the substrate/backing film (FIG. 11, Block 1500). As described above, a backing film holding member 152 is employed to maintain separation of the backing film 199 at the pre-separated corner 700 while in other aspects, gravity or any other mechanical or pneumatic mechanism maintains the separation of the backing film 199 at the pre-separated corner 700. The backing film separating member 139 is moved relative to the substrate 198, such as through operation of one or more of the support member drive unit 110 and the separating member drive unit 130, so that the backing film separating member passes between the backing film 199 and the substrate 198 from the first location along a length of the substrate 198 to break the bond between the backing film 199 and the substrate 198 (FIG. 11, Block 1510). As can be seen in FIG. 9D the backing film separating member 139 is moved in the directions 901, 902 along a predetermined path 950 (e.g. to sweep across different regions of the substrate while following a predetermined path such as moving in a first direction relative to the substrate and in a second direction angled or opposite the first direction) while the backing film separating member 139 rotates in the direction of arrow 900 for separating the backing film 199 from the substrate 198. As can be seen in FIG. 9B, in one aspect, the backing film holding member 152 removes the backing film 199 as the backing film 199 is separated from the substrate 198. In another aspect, the backing film holding member 153 such as a roller is movable relative to the substrate 198 and moves relative to the backing film separating member 139 for removing the backing film 199 as the backing film 199 is separated from the substrate 198. For example, the backing film holding member 153 rotates in the direction of arrow 153 for rolling the backing film 199 around the backing film holding member 153 for removal of the backing film 199.

Referring to FIGS. 1, 2, 3, and 10A-10E an exemplary operation of the backing film removal system will be described according to an aspect of the present disclosure. In one aspect the substrate support member 105 (which in this aspect includes automated robot 116 but in other aspects includes gantry system 117 or other support for supporting the substrate while separating the backing film 199) holds the substrate 198 side of the pre-impregnated material, as described above, such that the backing film 199 faces upwards, while in other aspects the substrate 198 is held so that the backing film faces downwards as described above. The substrate 198 in this aspect has an irregular or non-uniform shape. As described above, the backing film separating member 139 is disposed on an automated robot 137 (or in other aspects a gantry system 138) so as to move linearly in two dimensions (e.g. directions 901, 902) as well as rotate about axis 972. The backing film separating member 139 is inserted or positioned between the backing film 199 and the substrate 198 at a first location of the substrate such as at a pre-separated corner 700 of the substrate/backing film (FIG. 11, Block, 1500). As described above, a backing film holding member 152 is employed to maintain separation of the backing film 199 at the pre-separated corner 700 while in other aspects, gravity or any mechanical or pneumatic mechanism maintains the separation of the backing film 199 at the pre-separated corner 700. The backing film separating member 139 is moved relative to the substrate 198, such as through operation of one or more of the support member drive unit 110 and the separating member drive unit 130, so that the backing film separating member passes between the backing film 199 and the substrate 198 from the first location along a length of the substrate to break the bond between the backing film 199 and the substrate 198 (FIG. 11, Block 1510). As can be seen in FIGS. 10A-10E the backing film separating member 139 is moved in the directions 901, 902 along a predetermined path 960 (e.g. similar to path 950 described above) while the backing film separating member 139 rotates in the direction of arrow 900 for separating the backing film 199 from the substrate 198. In one aspect, the path 960 is arranged so that the backing film separating member 139 (such as wire 140) remains substantially between the substrate 198 and backing film 199 while transitioning between lobes, corners, or contoured edges of the substrate 198 so that the backing film 199 and/or substrate 198 are not torn during removal of the backing film 199 (e.g. the backing film separating member 139 enters between the substrate 198 and backing film 199 only at separated edges).

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 12 and an aircraft 1102 as shown in FIG. 13. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, the aircraft 1102 produced by the illustrative method 1100 may include an airframe 1118 with a plurality of high-level systems and an interior 1122. Examples of high-level systems, which are distributed throughout the aircraft, include one or more of a propulsion system 1124, an electrical power system 1126, a hydraulic system 1128, and an environmental system 1130. Any number of other systems may be included. Although an aerospace example is shown, the principles of the invention may be applied to other industries, such as the automotive industry.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., operation, maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

A1. A backing film removal system including a substrate support member configured to support a substrate, where a backing film is attached to the substrate, a backing film separating member arranged operatively with respect to the substrate support member such that at least a portion of the backing film separating member is positionable between at least one portion of the substrate and backing film when the substrate is disposed on the substrate support member, a backing film holding member configured to maintain a separation between the substrate and backing film at the at least one portion of the substrate and backing film, and at least one drive unit connected to one or more of the substrate support member and the backing film separating member and operable to cause relative movement between the substrate support member and the backing film separating member.

A2. The backing film removal system of paragraph A1, wherein the backing film separating member comprises a wire.

A3. The backing film removal system of paragraphs A1 or A2, wherein the backing film separating member comprises a monofilament wire.

A4. The backing film removal system of any of paragraphs A1-A3, wherein the backing film separating member is arranged at a crossing angle relative to a direction of relative movement between the backing film separating member and the substrate support member.

A5. The backing film removal system of any of paragraphs A1-A4, further comprising a backing film collection unit configured to receive the backing film upon separation of the backing film from the substrate.

A6. The backing film removal system of any of paragraphs A1-A5, wherein the at least one drive unit includes a separating member drive unit connected to the backing film separating member, the apparatus further comprising: a frame including guide members, the separating member drive unit configured to drive the backing film separating member along the guide members.

A7. The backing film removal system of any of paragraphs A1-A6, wherein the backing film separating member as a first and second end and the separating member drive unit is configured to drive the first and second ends along the guide members in unison or differentially.

A8. The backing film removal system of any of paragraphs A1, A4 and A5, further comprising a transport device to which the backing film separating member is mounted, the transport device being configured to move the backing film separating member along a predetermined path between the backing film and substrate to effect separation of the backing film from the substrate.

A9. The backing film removal system of paragraph A8, wherein the backing film separating member is rotatably coupled to the transport device where the transport device drives the backing film separating member both rotationally and linearly relative to the substrate support member.

A10. The backing film removal system of any of paragraphs A1-A9, further comprising an automated robot, the substrate support member comprising an end-effector coupled to the automated robot.

A11. The backing film removal system of any of paragraphs A1-A10 further comprising a backing film holding member configured to maintain a separation between the backing film and the substrate at a pre-separated portion of the substrate to effect positioning of the backing film separating member between the at least one portion of the substrate and backing film.

B. A method for removing a backing film from a substrate, the backing film attached to the substrate along at least a portion of the substrate, the method including positioning a backing film separating member between the backing film and the substrate at a first location; and moving the backing film separating member relative to the substrate so that the backing film separating member is passed between the backing film and the substrate from the first location along a length of the substrate to separate the backing film from the substrate.

B1. The method of paragraph B, wherein the passage of the backing film separating member between the backing film and the substrate displaces a portion of the backing film relative the substrate to effect a separation of the backing film from the substrate.

B2. The method of paragraphs B or B1, wherein moving the backing film separating member relative to the substrate includes moving the backing film separating member at an angle relative to a direction of relative movement between the backing film separating member and the substrate.

B3. The method of any of paragraphs B-B2, wherein moving the backing film separating member relative to the substrate includes moving the backing film separating member at an angle relative to a direction of fibers in the substrate.

B4. The method of any of paragraphs B-B3, wherein moving the backing film separating member relative to the substrate includes moving the backing film separating member in a first direction relative to the substrate and in a second direction angled to or opposite the first direction.

B5. The method of paragraph B4, wherein moving the backing film separating member relative to the substrate includes moving the backing film separating member linearly and rotationally relative to the substrate.

B6. The method of any of paragraphs B-B5, further comprising: positioning a substrate on a substrate support member; and wherein moving the backing film separating member relative to the substrate includes moving the substrate using a drive unit coupled to the substrate support member.

B7. The method of any of paragraphs B-B6, further comprising maintaining a separation between the backing film and the substrate at least at the first location using a backing film holding member.

B8. The method of any of paragraphs B-B7, wherein the substrate is a fibrous material and the backing film separating member is arranged at a crossing angle relative to a direction of fibers in the fibrous material B9. The method of any of paragraphs B-B8, further collecting the backing film separated from the substrate with a backing film collection unit.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A backing film removal system comprising:
a substrate support member configured to support a substrate, where a backing film is attached to the substrate;
a backing film separating member arranged operatively with respect to the substrate support member such that at least a portion of the backing film separating member is positionable between at least one portion of the substrate and backing film when the substrate is disposed on the substrate support member;
a backing film holding member configured to maintain a separation between the substrate and backing film at the at least one portion of the substrate and backing film;
at least one drive unit connected to one or more of the substrate support member and the backing film separating member and operable to cause relative movement between the substrate support member and the backing film separating member; and
a transport device to which the backing film separating member is mounted, the transport device being configured to move the hacking film separating member along a predetermined path between the backing film and substrate to effect separation of the backing film from the substrate;
wherein the backing film separating member is rotatably coupled to the transport device where the transport device drives the hacking film separating member both rotationally and linearly relative to the substrate support member.

2. The backing film removal system of claim 1, wherein the backing film separating member comprises a wire.

3. The backing film removal system of claim 1, wherein the backing film separating member comprises a monofilament wire.

4. The backing film removal system of claim 1, wherein the backing film separating member is arranged at a crossing angle relative to a direction of relative movement between the backing film separating member and the substrate support member.

5. The backing film removal system of claim 1, further comprising an automated robot, the substrate support member comprising an end-effector coupled to the automated robot.

6. The backing film removal system of claim 1, wherein the backing film holding member is configured to maintain a separation between the backing film and the substrate at a pre-separated portion of the substrate to effect positioning of the backing film separating member between the at least one portion of the substrate and backing film.

7. The backing film removal system of claim 1, further comprising a backing film collection unit configured to receive the backing film upon separation of the backing film from the substrate.

8. A method for removing a backing film from a substrate, the backing film attached to the substrate along at least a portion of the substrate, the method comprising:
positioning a backing film separating member between the backing film and the substrate at a first location; and
moving the backing film separating member relative to the substrate so that the backing film separating member is passed between the backing film and the substrate from the first location along a length of the substrate to separate the backing film from the substrate;
wherein moving the backing film separating member relative to the substrate includes moving the backing film separating member in a first direction relative to the substrate and in a second direction angled to or opposite the first direction, and moving the backing film separating member relative to the substrate includes moving the backing film separating member linearly and rotationally relative to the substrate.

* * * * *